(12) United States Patent
Bruce

(10) Patent No.: US 7,766,791 B2
(45) Date of Patent: Aug. 3, 2010

(54) SYSTEM FOR PROTECTING A POWERTRAIN

(75) Inventor: Timothy Alan Bruce, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 331 days.

(21) Appl. No.: 12/073,137

(22) Filed: Feb. 29, 2008

(65) Prior Publication Data

US 2009/0221392 A1  Sep. 3, 2009

(51) Int. Cl.
*B60W 10/04* (2006.01)
*F16H 35/10* (2006.01)

(52) U.S. Cl. ......................................... 477/35; 475/263

(58) Field of Classification Search ................. 180/249; 477/35
See application file for complete search history.

(56) References Cited

U.S. PATENT DOCUMENTS

| | | | |
|---|---|---|---|
| 3,051,256 A | 8/1962 | Brandt | |
| 3,448,635 A | 6/1969 | Nelson | |
| 3,688,522 A | 9/1972 | Schmuck | |
| 3,780,821 A | 12/1973 | Prange | |
| 3,886,813 A | 6/1975 | Baremor | |
| 3,894,446 A * | 7/1975 | Snoy et al. | 475/88 |
| 3,901,092 A * | 8/1975 | Romick | 475/249 |
| 4,263,824 A | 4/1981 | Mueller | |
| 4,387,795 A | 6/1983 | Mueller | |
| 4,651,847 A | 3/1987 | Hermanns | |
| 5,044,458 A | 9/1991 | Schwarz et al. | |
| 5,711,389 A | 1/1998 | Schlosser | |
| 6,623,395 B2 * | 9/2003 | Lovatt | 475/204 |
| 6,705,966 B2 | 3/2004 | Schröder et al. | |
| 7,037,231 B2 | 5/2006 | Showalter | |
| 7,377,871 B2 * | 5/2008 | Bowen | 475/263 |
| 2007/0225105 A1 | 9/2007 | Bowen | |

FOREIGN PATENT DOCUMENTS

| | | |
|---|---|---|
| JP | 60148721 | 8/1985 |
| JP | 63097427 | 4/1988 |
| JP | 2762419 | 6/1998 |
| JP | 3627289 | 3/2005 |

* cited by examiner

*Primary Examiner*—Dirk Wright
(74) *Attorney, Agent, or Firm*—Finnegan, Henderson, Farabow, Garrett & Dunner, LLP

(57) ABSTRACT

A powertrain for a machine is disclosed. The powertrain has a power source and a transmission that is operably connected to the power source. The powertrain also has a differential that is operably connected to the transmission. The powertrain further has a first and second shaft that are operably connected to the differential. The first and second shaft respectively actuate a plurality of traction devices. The powertrain also has a clutch associated with the differential and configured to selectively reduce a total traction available to the machine by releasing the differential as a function of a torque produced by the power source.

20 Claims, 3 Drawing Sheets

SYSTEM FOR PROTECTING A POWERTRAIN

TECHNICAL FIELD

The present disclosure is directed to a system for protecting a powertrain and, more particularly, to a system having an inter-axle differential for protecting a powertrain.

BACKGROUND

Many machines include a powertrain for actuating traction devices such as, for example tires. The powertrain typically includes a driveshaft that connects a power source of the machine to a number of axles. The power source typically produces torque to rotate the driveshaft, which in turn provides torque to the axles and the traction devices. Traction forces develop between the traction devices and the ground, allowing the machine to propel itself. The amount of available traction force increases as the weight of the machine increases. Traction devices may slip relative to the ground when the torque transmitted to the traction devices by the power source exceeds the available traction force that can be developed.

For example, when a machine such as a tractor is used to pull a scraper during earthmoving construction, the additional weight of the scraper may greatly increase the traction force that can be developed by the machine. The power source and transmission of the machine may deliver excessive levels of torque to the axles, but not high enough to cause the traction devices to slip. Excessive torque may damage the machine before the traction devices slip.

One attempt at preventing excessive torque is a machine is described in U.S. Pat. No. 3,894,446 (the '446 patent) issued to Snoy et al. The '446 patent discloses a power transmission for a vehicle that has an inter-axel differential for the front and rear axles. The '446 patent discloses that the differential is equipped with a slippable friction clutch that provides a predetermined amount of torque differential for accommodating slipping conditions. The '446 patent also discloses that a torque bias of the friction clutch is determined by the load capacity of the drive train. The friction clutch serves to protect the drive train from excessive loads by slipping when the predetermined torque value is attained. The '446 patent discloses that the friction clutch may be completely released before high speed slip values may cause failure of the clutch.

Although the system of the '446 patent may provide a method for protecting a powertrain from damage due to excessive torque, the system is vulnerable to clutch failure due to high speed slip values. Additionally, the system may not reduce traction of a vehicle, which may increase the possibility of damage to the powertrain.

The present disclosure is directed to overcoming one or more of the problems set forth above.

SUMMARY OF THE DISCLOSURE

In accordance with one aspect, the present disclosure is directed toward a powertrain for a machine. The powertrain includes a power source and a transmission that is operable connected to the power source. The powertrain also includes a differential that is operable connected to the transmission. The powertrain further includes a first and second shaft that are operably connected to the differential. The first and second shaft respectively actuate a plurality of traction devices. The powertrain also includes a clutch associated with the differential and configured to selectively reduce a total traction available to the machine by releasing the differential as a function of a torque produced by the power source.

According to another aspect, the present disclosure is directed toward a method for reducing torque of a powertrain. The method includes measuring a torque produced by a power source. The method also includes selectively locking a first and a second shaft together via a differential when a measured torque is less than a determined torque. The method further includes selectively unlocking the first and second shaft, allowing the differential to operate as an open differential, when the measured torque exceeds the determined torque.

DETAILED DESCRIPTION

Figure 1:
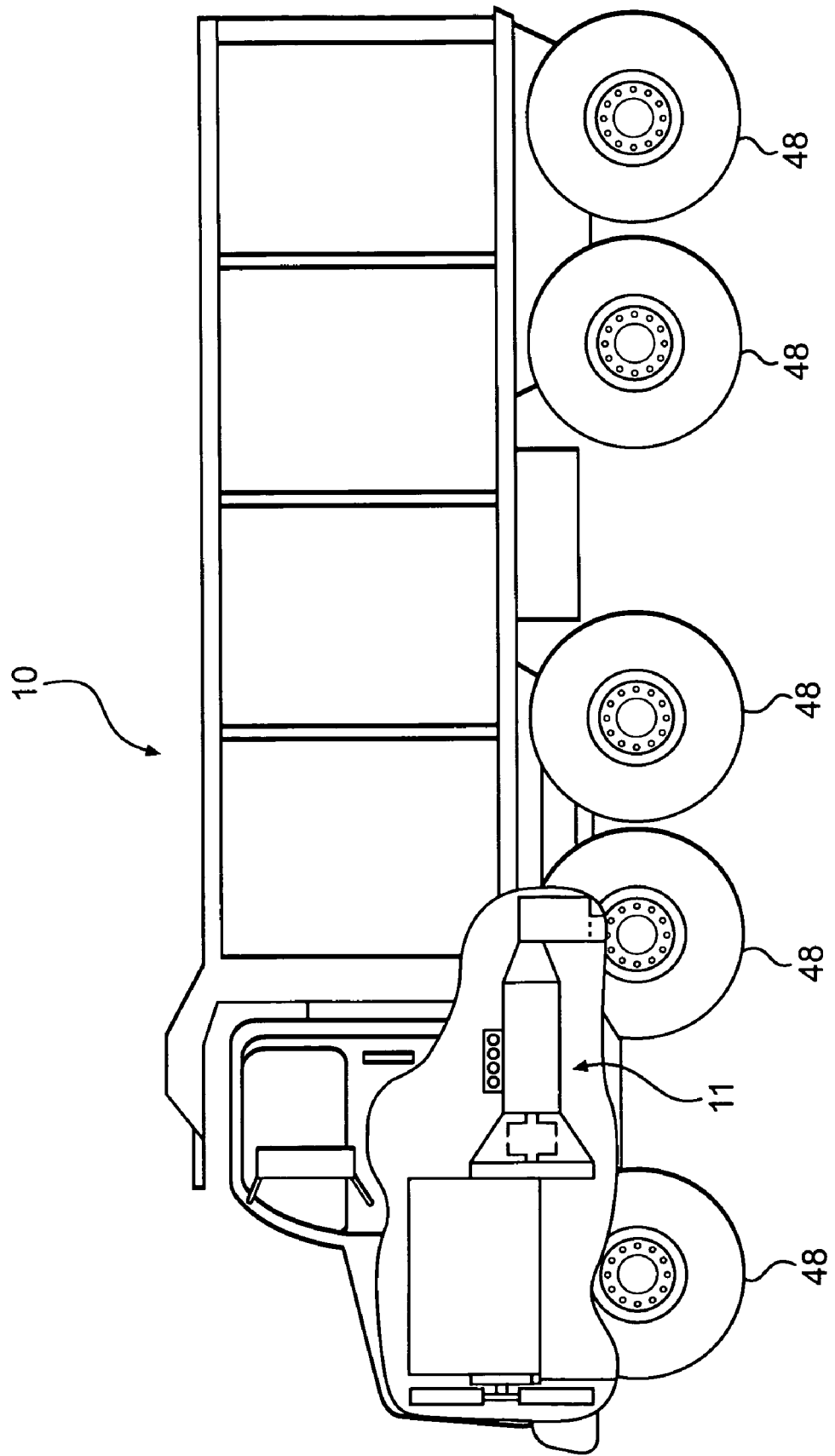
FIG. 1 is an pictorial illustration of an exemplary disclosed machine.

FIG. 1 illustrates an exemplary machine 10. Machine 10 may be fixed or mobile vehicle that performs some type of operation association with an industry such as mining, construction, farming, transportation, or any other industry know in the art. For example, machine 10 may be an earth moving machine such as an off-highway truck, a wheel loader, a motor grader, or any other earth moving machine. Machine 10 may alternatively be a passenger vehicle or any other suitable operation-performing machine. It is contemplated that machine 10 may be configured to carry additional heavy equipment such as, for example, a scraper for use in earthmoving work. Machine 10 may include an exemplary powertrain 11.

Figure 2:
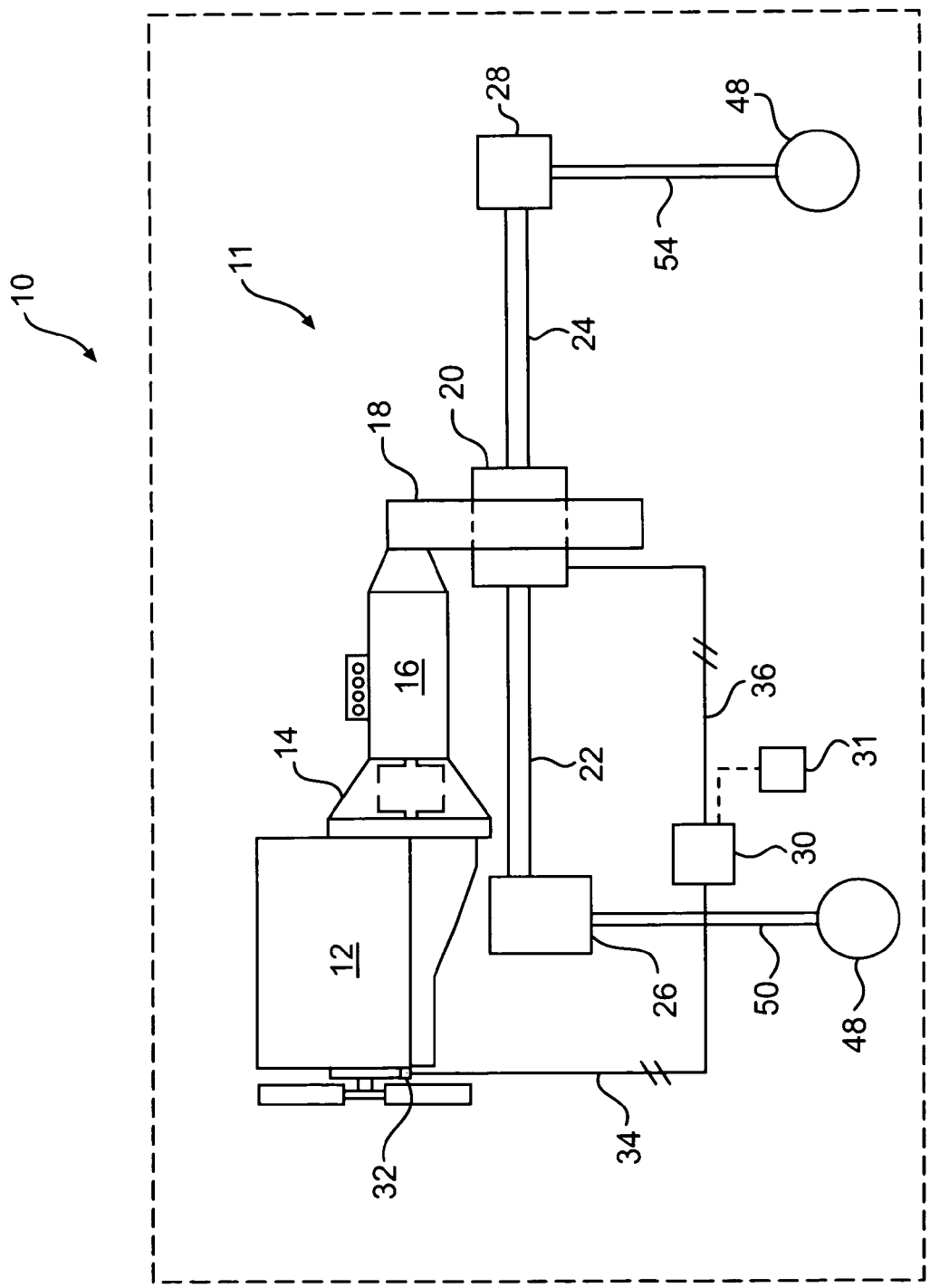
FIG. 2 is a schematic illustration of an exemplary disclosed powertrain of the machine of FIG. 1.

Powertrain 11, illustrated in FIG. 2, may include a power source 12, a torque converter 14, and a transmission 16 including an output transfer gear 18 that is operably connected to a differential 20. Powertrain 11 may also include a front shaft 22 operably connecting differential 20 to a front output 26 and a rear shaft 24 operably connecting differential 20 to a rear output 28. Front output 26 and rear output 28 may connect to respective traction devices 48 via an axle 50 and an axle 54. Powertrain 11 may also include a controller 30 that is electronically connected to a sensor 32, associated with a power source 12, and connected to differential 20.

Power source 12 may be configured to produce a power output and may include an internal combustion engine. For example, power source 12 may include a diesel engine, an gasoline engine, a gaseous fuel-powered engine, or an other engine apparent to one skilled in the art. It is contemplated that power source 12 may alternatively include a non-combustion source such as, for example, a battery, a fuel cell, a motor, or any other known non-combustion source of power. It is contemplated that power source 12 may alternatively include a non-combustion source such as, for example, a battery, a fuel cell, a motor, or any other known non-combustion source of power. It is contemplated that power source 12 may actuate transmission 16, front shaft 22, and rear shaft 24.

Torque converter 14 may be a hydraulic device configured to couple transmission 16 to power source 12. Torque converter 14 may allow power source 12 to rotate substantially independent of transmission 16. It is contemplated that torque converter 14 may alternately be embodied in a non-hydraulic device such as, for example, a mechanical diaphragm clutch.

Transmission 16 may include various components, including output transfer gear 18, that interact to transmit power from power source 12 to actuate machine 10. In particular, transmission 16 may be a multi-speed bi-directional mechanical transmission having a neural gear ratio, a plurality of forward gear ratios, a reverse gear ratio, and one or more clutches. The clutches may be selectively actuated to engage predetermined combinations of gears (i.e., output transfer gear 18) to produce a desired output gear ratio. It is contemplated that transmission 16 may be a four-wheel drive transmission. It is also contemplated that transmission 16 may be an automatic-type transmission, shifting based on a power source speed, a maximum selected gear ratio, and a shift map, or a manual-type transmission, shifting between each gear as initiated by an operator. The output of transmission 16 may be configured to rotatably drive front shaft 22 and rear shaft 24 via output transfer gear 18 and differential 20.

Differential 20 may be an inter-axel open differential, and may operate to equally distribute the torque from output transfer gear 18 to front shaft 22 and rear shaft 24. Specifically, differential 20 may operate as an open differential to ensure that a substantially equal amount of torque is transferred to axle 50 and axle 54. Although differentials are conventionally used to increase available traction, differential 20 may operate instead to reduce available traction and thereby protect powertrain 11 from damage, as described below. Front shaft may actuate axle 50 and at least one traction device 48, via front output 26, and rear shaft 24 may actuate axle 54 and at least one traction device 48, via rear output 28. It is contemplated that powertrain 11 may include additional axles, such as, for example, a center axle.

Figure 3:
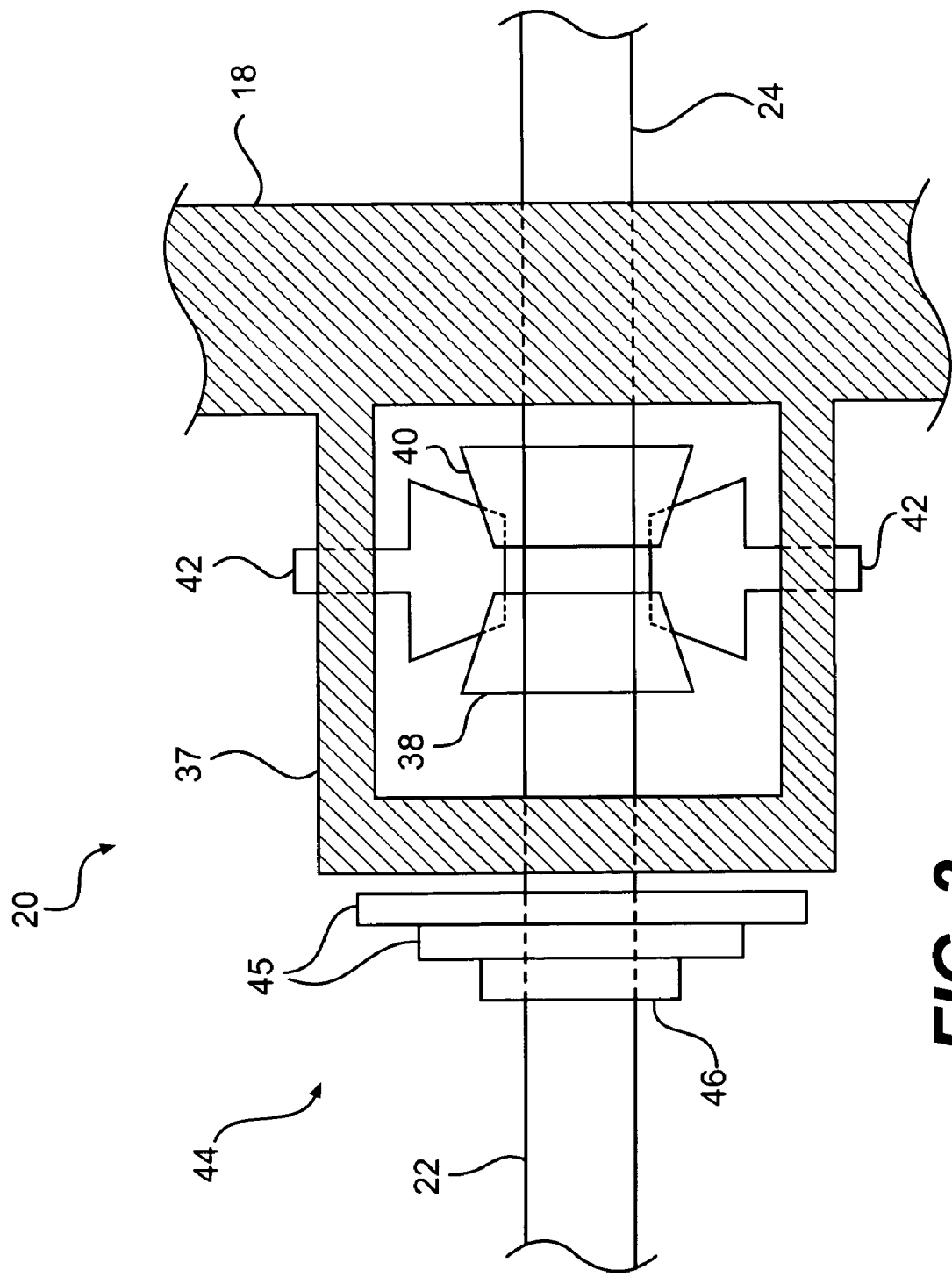
FIG. 3 is a cross-section of and exemplary disclosed differential of the powertrain of FIG. 2.

As shown in FIG. 3, differential 20 may be connected to output transfer gear 18, and may include a housing 37 that may be integral with gear 18 or fixedly attached to gear 18 by a suitable method know in the art such as, for example, welding. Housing 37 may include orifices for receiving and seating a first end of front shaft 22 and a first end of rear shaft 24. A yoke (not shown) of machine 10 may receive a second end of front shaft 22 at front 26 and a second end of rear shaft 24 at rear output 28, thereby securing front shaft 22 and rear shaft 24 in place on machine 10. the first end of front shaft 22 may include a side gear 38 and the first end of rear shaft 24 may include side gear 40. Side gear 38 and side gear 40 may be located within housing 37 in an opposing configuration, as shown in FIG. 3. Housing 37 may also secure pinion gears 42 configured to mesh with side gear 38 and side gear 40. It is contemplated that pinion gears 42 freely spin within housing 37 when front shaft 22 and rear shaft 24 are rotating at different speeds.

Differential 20 may include a lockup clutch 44 that may be configured to lock housing 37 to front shaft 22. Lockup clutch 44 may be configured to move from a locked position, locking housing 37 to front shaft 22 and causing front shaft 22, housing 37, and output transfer gear 18 to rotate together as a single unit, to an unlocked position, allowing front shaft 22 to rotate freely from housing 37. When differential 20 is in the locked position, pinion gears 42 may remain stationary and connect front shaft 22 to rear shaft 24, so that front shaft 22 and rear shaft 24 may transfer the same torque. Therefore, when lockup clutch 44 is in the locked position, differential 20 does not operate as an open differential, and front shaft 22 and rear shaft 24 rotate together as if they were a single drive shaft. When lockup clutch 44 is in the unlocked position, differential 20 may effectively act as an open differential, transferring an equal amount of torque to front shaft 22 and rear shaft 24, with pinion gears 2 spinning freely.

Clutch 44 may include an actuator 46 and one or more friction plates 45, where actuator 46 and friction plates 45 may be attached to front shaft 22. When lockup clutch 44 is in the unlocked position, there may be gap between friction plates 45 and housing 37. Actuator 46 may be a hydraulic actuator, and may operate to displace friction plates 45 against housing 37 when clutch 44 is in the locked position. Friction forces may develop between friction plates 45 and housing 37, causing them to rotate together. It is contemplated that differential 20 may be configured to lock rear shaft 24, instead of front shaft 22, and have a substantially similar effect on powertrain 11. It is contemplated that lockup clutch 44 may be locked to prevent differential 20 from acting as an open differential (i.e., as if there was a single drive shaft) or may be unlocked to allow differential 20 to act as an open differential and allow front shaft 22 and rear shaft 24 to receive and equal amount of torque.

Machine 10 may include controller 30 configured to control and operation of differential 20. Controller 30 may be embodied in a single microprocessor of multiple microprocessors configured to affect control of machine functions. Various other known circuits may be associated with controller 30, including power supply circuitry, and other appropriate circuitry. Controller 30 may be in electrical communication with a sensor 32 vial a communication line 34 to receive data indicative of an engine speed and/or power of power source 12 or an operating gear of transmission 16, that may be used to estimate the torque produced by power source 12 or and operating gear of transmission 16, that may be used to estimate the torque produced by power source 12. Controller 30 may be associated with torque estimator map 31 to determine under what conditions power source 12 may be producing torque that may potentially damage powertrain 11.

Torque estimator map 31 may include a digital database and/or a computer processor containing a computer algorithm, or any other suitable arrangement known in the art for providing input to controller 30. In an exemplary embodiment, torque estimator map 31 may be associated with controller 30, where controller 30 may include a parameter indicative of a threshold value of torque (i.e., a safe torque) above which powertrain 11 may be damaged. The safe torque may be a determined value based on existing conditions affecting a structural capacity for torsion of powertrain 11. It is contemplated that torque estimator map may estimate the torque being produced by power source 12 as a function of data provided to controller 30 by sensor 32 such as, for example, a speed and/or power of power source 12 and each gear at which transmission 16 may operate, and may provide this data to controller 30. Controller 30 may perform algorithms to compare the estimated torque provided by torque estimator map 31 with the safe torque to determine if power source 12 may be capable of generating enough torque to damage powertrain 11. Based on the torque calculation, controller 30 may lock or unlock clutch 44 of differential 20, by activating actuator 46 via communication line 36. It is contemplated that controller 30 may also be in communication with an operator interface (not shown), so that an operator may manually lock or unlock differential 20.

The torque generated within powertrain 11 may be limited to the traction available to machine 10. Power source 12 may generate increasing torque via powertrain 11 to traction devices 48 as long as there is opposing traction to provide a reaction for the torque. When traction devices 48 slip, the opposing traction force significantly reduces, affecting a corresponding reduction in the torque generated within powertrain 11. As described below, the available traction may be limited, by a ballasting of machine 10 and the operation of differential 20, to the safe torque. Thus, differential 20 may be used to decrease torque transferred through powertrain 11, instead of increasing torque as is conventional in the art.

Available traction (i.e., the maximum force that may be developed between a tire and the ground) may be estimated as a function of the weight of machine 10. For example, as the weight of machine 10 increases, the amount of available traction that can be developed by powertrain 11 also increases. Traction devices 48 (e.g., tires) may slip when the torque transmitted to traction devices 48 exceeds the available traction force. The distribution of weight between the front and rear axles of machine 10 may not affect available traction when clutch 44 is in the locked position (i.e., the entire weight of machine 10 contributes to available traction).

When clutch 44 is unlocked and differential 20 acts as an open differential, however, the ballasting of machine 10 (i.e., the distribution of weight between the front axle and the rear axle) may affect the total traction available to machine 10. When differential 20 is unlocked, the available traction may be limited to the weight of the lightest axle, reduced by a coefficient of traction, as is known in the art. Therefore, when differential 20 is unlocked and acts as an open differential, the amount of traction available to machine 10 may be less than when differential 20 is locked. The traction available to machine 10 may decrease as the weight of the lightest axle decreases. It is contemplated that machine 10 may be ballasted to yield a lightest axle weight that may limit available traction to substantially equal the safe torque. It is contemplated that when controller 30 determines that power source 12 may generate a torque exceeding the safe torque, controller 30 may unlock differential 20 and, by limiting the available traction, limit the torque that may be developed.

INDUSTRIAL APPLICABILITY

The disclosed system may help to protect a powertrain by selectively employing an inter-axle open differential to reduce traction, as opposed to its conventional use of increasing traction. The system may allow traction devices to slip, thereby preventing potentially damaging torque from being introduced into a powertrain.

Powertrain 11 may operate when lockup clutch 44 is in a first, locked position. Clutch 44 may lock housing 37 of differential 20 to front shaft 22, causing front shaft 22 and rear shaft 24 to rotate together, as a single drive shaft. In this first position, the entire weight of machine 10 may contribute to the available traction, where traction may not be limited by differential 20. Controller 30 may monitor input from torque estimator map 31 and sensor 32, comparing estimated torque values to the safe torque. When sensor 32 detects an estimated torque amount produced by power source 12 that may exceed the safe torque, controller 30 may affect actuator 46 to move clutch 44 to the unlocked position, causing front shaft 22 to be released from housing 37. Front shaft 22 and rear shaft 24 may then rotate freely from each other, allowing differential 20 to act as an open differential.

When differential 20 is acting as an open differential, the total traction available to machine 10 may be limited by the ballasted weight of the lightest axle of machine 10. Since the lightest axle of machine 10 may be ballasted to limit the available traction to a force corresponding to the safe torque, traction devices 48 may slip when the torque transmitted to them exceeds the safe torque. As traction devices 48 slip, the available traction reactions against traction devices 48 may significantly reduce, affecting a corresponding reduction of the torque forces within powertrain 11. Since the torque within powertrain 11 is limited to the safe torque, powertrain 11 may not be damaged.

In an exemplary embodiment, solely for purposes of illustration and not as a limitation, machine 10 may be ballasted so that the front axle supports 32,520 lbs and the rear axle supports 49,480 lbs. The available traction when clutch 44 is in a locked position may be the total weight, reduced by a coefficient of traction of 0.8, resulting in 65,600 lbs Rim-pull. Therefore, when clutch 44 is locking front shaft 22 to housing 37, machine 10 may exert 65,600 lbs Rim-pull to propel itself, before any traction device 48 skips. The torque produced by power source 12 to produce 65,600 lbs Rim-pull, however, may damage powertrain 11. The safe torque that can be produced by power source 12 before damaging powertrain 11 may correspond to approximately 52,000 lbs Rim-pull. The lightest axle of machine 10 may be ballasted to limit available traction to approximately 52,000 lbs Rim-pull when clutch 44 is in an unlocked position. If controller 30 senses that power source 12 may produce a torque corresponding to more than 52,000 lbs Rim-pull, clutch 44 may release front shaft 22 and allow differential 20 to operate as an open differential. Traction devices 48 may slip when the force transmitted by them exceeds the available traction of 52,000 lbs Rim-pull, thereby limiting the torque within powertrain 11 to the safe torque.

Machine 10 may include differential 20 capable of limiting available traction to protect powertrain 11. When a potentially damaging level of torque may develop within powertrain 11, lockup clutch 44 may be released, allowing differential 20 to act as an open differential. Differential 20 may allow traction devices 48 to skip, preventing excessive torque forces from being developed within powertrain 11. Therefore, powertrain 11 may be protected by using inter-axel differential 20 to decrease the total traction available to machine 10, as opposed to the conventional role of using differentials to increase available traction.

It will be apparent to those skilled in the art that various modifications and variations can be made to the disclosed powertrain system. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A powertrain for a machine, comprising:
   a power source;
   a transmission operably connected to the power source;
   a differential operably connected to the transmission;
   a first and second shaft, operably connected to the differential, the first and second shaft respectively actuating a plurality of traction devices; and
   a clutch associated with the differential and configured to selectively reduce a total traction available to the machine by releasing the differential as a function of a torque produced by the power source.

2. The powertrain of claim 1, further including a sensor associated with the power source, the sensor configured to produce a signal indicative of a torque produced by the power source.

3. The powertrain of claim 2, further including a controller, the controller configured to selectively lock and unlock the differential based on the signal.

4. The powertrain of claim 3, wherein the controller selectively unlocks the differential when the signal is indicative of a torque that is capable of substantially damaging the powertrain.

5. The powertrain of claim 4, wherein the differential is configured as an open differential when the signal is indicative of the torque that is capable of substantially damaging the powertrain.

6. The powertrain of claim 3, wherein the controller selectively locks the differential when the signal is indicative of a torque that is not capable of substantially damaging the powertrain.

7. The powertrain of claim 3, wherein the controller is configured to estimate the torque as a function of the signal, the signal indicative of a speed and a power produced by the power source.

8. The powertrain of claim 1, wherein the clutch is hydraulically actuated and includes at least one friction plate.

9. A method for reducing torque of a powertrain, comprising:
 measuring a torque produced by a power source;
 selectively locking a first and a second shaft together via a differential when a measured torque is less than a determined torque; and
 selectively unlocking the first and second shaft, allowing the differential to operate as an open differential, when the measured torque exceeds the determined torque.

10. The method of claim 9, further including producing a signal indicative of the measured torque produced by the power source.

11. The method of claim 10, wherein the differential is selectively unlocked when the signal is indicative of a torque that is capable of substantially damaging the powertrain.

12. The method of claim 10, wherein the differential is selectively locked when the signal is indicative of a torque that is not capable of substantially damaging the powertrain.

13. The method of claim 9, wherein the measured torque is estimated as a function of a speed and a power produced by the power source.

14. A machine, comprising:
 a power source;
 a transmission operably connected to the power source via a torque converter;
 an output transfer gear operably connected to the transmission;
 a differential operably connected to the output transfer gear;
 a first shaft and a second shaft operably connected to the differential, the first shaft actuating a first output and the second shaft actuating a second output;
 a first axle and a first plurality of traction devices actuated by the first output;
 a second axle and a second plurality of traction devices actuated by the second output; and
 a clutch associated with the differential, the clutch configured to selectively reduce a total traction available to the machine by releasing the differential to allow at least one traction device to slip as a function of a torque produced by the power source.

15. The machine of claim 14, further including a sensor associated with the power source, the sensor configured to produce a signal indicative of a torque produced by the power source.

16. The machine of claim 15, further including a controller, the controller configured to selectively lock and unlock the differential based on the signal.

17. The machine of claim 16, wherein the controller selectively unlocks the differential when the signal is indicative of a torque that is capable of substantially damaging the powertrain.

18. The machine of claim 17, wherein the differential is configured as an open differential when the signal is indicative of a torque that is capable of substantially damaging the powertrain.

19. The machine of claim 16, wherein the controller selectively locks the differential when the signal is indicative of a torque that is not capable of substantially damaging the powertrain.

20. The machine of claim 16, wherein the controller is configured to estimate the torque as a function of the signal, the signal indicative of a speed and a power produced by the power source.

* * * * *

UNITED STATES PATENT AND TRADEMARK OFFICE
CERTIFICATE OF CORRECTION

| | | |
|---|---|---|
| PATENT NO. | : 7,766,791 B2 | Page 1 of 3 |
| APPLICATION NO. | : 12/073137 | |
| DATED | : August 3, 2010 | |
| INVENTOR(S) | : Timothy Alan Bruce | |

It is certified that error appears in the above-identified patent and that said Letters Patent is hereby corrected as shown below:

Please correct the Specification as follows:

Column 1, line 13, delete "example" and insert -- example, --.

Column 1, line 33, delete "is a" and insert -- in a --.

Column 1, line 36, delete "inter-axel" and insert -- inter-axle --.

Column 1, line 60, delete "operable" and insert -- operably --.

Column 1, line 62, delete "operable" and insert -- operably --.

Column 2, line 20, delete "and" and insert -- an --.

Column 2, line 26, delete "be fixed" and insert -- be a fixed --.

Column 2, line 27, delete "association" and insert -- associated --.

Column 2, line 28, delete "know" and insert -- known --.

Column 2, line 47, delete "with a" and insert -- with --.

Column 2, line 51, delete "an" and insert -- a --.

Column 2, line 52, delete "an" and insert -- any --.

Column 2, lines 53-60, delete "It is contemplated that power source 12 may alternatively include a non-combustion source such as, for example, a battery, a fuel cell, a motor, or any other known non-combustion source of power. It is contemplated that power source 12 may alternatively include a Signed and Sealed this
Thirteenth Day of September, 2011

David J. Kappos
*Director of the United States Patent and Trademark Office* non-combustion source such as, for example, a battery, a fuel cell, a motor, or any other known non-combustion source of power." and
insert -- It is contemplated that power source 12 may alternatively include a non-combustion source such as, for example, a battery, a fuel cell, a motor, or any other known non-combustion source of power. --.

Column 2, line 65, delete "independent" and insert -- independently --.

Column 3, line 5, delete "neural" and insert -- neutral --.

Column 3, line 19, delete "inter-axel" and insert -- inter-axle --.

Column 3, line 28, delete "shaft may" and insert -- shaft 22 may --.

Column 3, line 36, delete "know" and insert -- known --.

Column 3, line 40, delete "front 26" and insert -- front output 26 --.

Column 3, line 42, delete "the" and insert -- The --.

Column 3, line 48, delete "42 freely" and insert -- 42 may freely --.

Column 3, line 67, delete "2" and insert -- 42 --.

Column 4, line 4, delete "be gap" and insert -- be a gap --.

Column 4, line 17, delete "and" and insert -- an --.

Column 4, line 19, delete "and" and insert -- an --.

Column 4, line 20, delete "of" and insert -- or --.

Column 4, line 23, delete "circuitry, and" and insert -- circuitry, signal-conditioning circuitry, solenoid driver circuitry, communication circuitry, and --.

Column 4, line 25, delete "vial" and insert -- via --.

Column 4, lines 27-30, delete "or an operating gear of transmission 16, that may be used to estimate the torque produced by power source 12 or and operating gear of transmission 16, that may be used to estimate the torque produced by power source 12." and
insert -- or an operating gear of transmission 16, that may be used to estimate the torque produced by power source 12. --.

Column 5, line 51, delete "torque." and insert -- torque --.

CERTIFICATE OF CORRECTION (continued)
U.S. Pat. No. 7,766,791 B2

Column 6, line 12, delete "skips." and insert -- slips. --.

Column 6, line 31, delete "skip," and insert -- slip, --.

Column 6, line 33, delete "inter-axel" and insert -- inter-axle --.